US010338095B2

(12) United States Patent
Pistrol et al.

(10) Patent No.: US 10,338,095 B2
(45) Date of Patent: Jul. 2, 2019

(54) METHOD FOR THE CORRECTION OF A MEASURED VALUE CURVE BY ELIMINATING PERIODICALLY OCCURRING MEASUREMENT ARTIFACTS, IN PARTICULAR IN A SOIL COMPACTOR

(71) Applicant: Hamm AG, Tirschenreuth (DE)

(72) Inventors: Johannes Pistrol, Mödling (AT); Fritz Kopf, Vienna (AT); Werner Völkel, Neustadt (DE); Sebastian Villwock, Pechbrunn (DE)

(73) Assignee: Hamm AG, Tirschenreuth (DE)

( * ) Notice: Subject to any disclaimer, the term of this patent is extended or adjusted under 35 U.S.C. 154(b) by 561 days.

(21) Appl. No.: 14/667,262

(22) Filed: Mar. 24, 2015

(65) Prior Publication Data

US 2015/0276794 A1   Oct. 1, 2015

(30) Foreign Application Priority Data

Mar. 25, 2014  (DE) .................. 10 2014 205 503

(51) Int. Cl.
  *G01P 21/00*  (2006.01)
  *G01D 3/032*  (2006.01)
  *E01C 19/28*  (2006.01)

(52) U.S. Cl.
  CPC .............. *G01P 21/00* (2013.01); *G01D 3/032* (2013.01); *E01C 19/288* (2013.01)

(58) Field of Classification Search
  CPC ........ G01P 21/00; G01D 3/032; E01C 19/288
  See application file for complete search history.

(56) References Cited

U.S. PATENT DOCUMENTS 4,870,601 A    9/1989 Sandstroem
5,343,707 A *  9/1994 Sata ..................... F25B 9/14
                                              324/248

(Continued)

FOREIGN PATENT DOCUMENTS

CN    101095165 A    12/2007
CN    102362497 A     2/2012

(Continued)

OTHER PUBLICATIONS

Aaron Neff ("Analysis of intelligent compaction field data on layered soil," M.S. Thesis, Colorado School of Mines, 2013).*

(Continued)

*Primary Examiner* — Yasser A Abdelaziez
(74) *Attorney, Agent, or Firm* — Prince Lobel Tye LLP

(57) ABSTRACT

A method is provided for the correction of a measured value curve by eliminating periodically occurring measurement artifacts. The method includes steps of provision of a measured value curve representing a periodically repeating event, division of the measured value curve into period-measured value curves allocated to a plurality of successive periods of the periodically repeating event, based on the period-measured value curves allocated to the plurality of periods, determination of a mean period-measured value curve, formation of a difference between the period-measured value curves allocated to the plurality of periods, and the mean period-measured value curve for the provision of the difference-period-measured value curves allocated in each case to the periods, and (Continued)

based on the difference-period-measured value curves, determination of a corrected measured value curve for the plurality of successive periods of the periodically repeating event.

13 Claims, 7 Drawing Sheets

(56) References Cited

U.S. PATENT DOCUMENTS

| | | | | |
|---|---|---|---|---|
| 5,934,824 | A * | 8/1999 | Vural | E01C 19/288 404/117 |
| 6,378,214 | B1 * | 4/2002 | Onion | B26B 1/048 30/160 |
| 6,462,560 | B1 | 10/2002 | Rezvani | |
| 2003/0147171 | A1 | 8/2003 | Li et al. | |
| 2014/0341650 | A1 * | 11/2014 | Villwock | E02D 3/026 404/117 |

FOREIGN PATENT DOCUMENTS

| | | |
|---|---|---|
| CN | 103116873 A | 5/2013 |
| CN | 103428609 A | 12/2013 |
| CN | 103549950 A | 2/2014 |
| CN | 103632675 A | 3/2014 |
| DE | 35 90 610 C2 | 9/1997 |
| DE | 198 14 763 A1 | 10/1999 |
| DE | 10 007 040 912 A1 | 3/2009 |
| DE | 102007040912 A1 | 3/2009 |
| EP | 1 219 932 A2 | 7/2002 |
| JP | H06-007313 A | 1/1994 |
| JP | H08-105011 A | 4/1998 |
| JP | H11-316843 A | 11/1999 |
| JP | 2000-345547 A | 12/2000 |
| JP | 2002-153435 A | 5/2002 |
| SE | 8405801 L | 5/1986 |
| WO | 2013/087783 A1 | 6/2013 |
| WO | WO2013087783 * | 6/2013 |

OTHER PUBLICATIONS

Office Action issued for Japanese Patent Application No. 2015-060585 dated Mar. 14, 2016 with machine English translation (4 pages).

Search Report issued for European Patent Application No. 15154311.3 dated Aug. 4, 2015, with machine English translation (12 pages).

816.300 Hydrologie und Wasserwirtschaftliche Planung VU 3SWS (4,5 ECTS): Übungsskript (2013). S 30-31 Verfügbar online unter https://iwhw.boku.ac.at/LVAB16300/daten/.../zeitreihenanalyse_13.pdf.

German Search Report issued for German Patent Application No. 10 2014 205 503.2 dated Nov. 25, 2014 with machine English translation (16 pages).

* cited by examiner

METHOD FOR THE CORRECTION OF A MEASURED VALUE CURVE BY ELIMINATING PERIODICALLY OCCURRING MEASUREMENT ARTIFACTS, IN PARTICULAR IN A SOIL COMPACTOR

CROSS REFERENCE TO RELATED APPLICATION(S)

This application claims priority to German Application No. 10 2014 205 503.2, filed Mar. 25, 2014, The entirety of the disclosure of the above-referenced application is incorporated herein by reference.

BACKGROUND OF THE INVENTION

Field of the invention

The present invention relates to a method by which, for example, in a soil compactor having at least one compactor roller, which in order to compact subsoil such as gravel, asphalt, or earth, moves over this subsoil, measurement artifacts contained in a measurement process representing the movement of the compactor roller can be eliminated.

Background of the Art

Soil compactors used for compacting the subsoil generally have compactor rollers, which contribute not only to subsoil compaction with their static load, but also with the high-frequency periodic oscillatory motions superimposed on the rotary motion of these compactor rollers, namely the motions of the compactor roller in the circumferential direction, or the vibrational motions, that is, motions in a back-and-forth direction. To produce these motion components superimposed on the rotation, unbalanced masses and the required drives are provided in the interior of the compactor rollers. Due to these additional masses, the occurrence of static or dynamic imbalances is virtually unavoidable, The result is that a periodic motion provoked by these imbalances is superimposed on the rotary motion of the compactor rollers with a period that generally corresponds to the period or frequency of the rotary motion.

For example, if a conclusion is to be drawn regarding the degree of compaction of the subsoil to be compacted by registering the motion state of such a compactor roller, it is necessary to obtain very precise information about the motion state, that is, for example, the acceleration of a compactor roller. The measurement artifacts provoked by such imbalances in the measured value curve reflecting the motion of such a compactor roller affect the assessability of such a measured value curve, for example for obtaining information about the degree of compaction of the subsoil.

SUMMARY OF THE INVENTION it is the object of the present invention to provide a method to correct a measured value curve by means of which periodically occurring measurement artifacts can be eliminated in a simple but reliable manner.

According to the present invention, this object is attained by a method for the correction of a measured value curve by eliminating periodically occurring measurement artifacts, in particular in a measured value curve that represents the motion of a compactor roller of a soil compactor, comprising the actions:

a) provision of a measured value curve representing a periodically repeating event, b) division of the measured value curve into period-measured value curves allocated to a plurality of successive periods of the periodically repeating event, c) based on the period-measured value curves allocated to the plurality of periods, determination of a mean period-measured value curve, d) formation of a difference between the period-measured value curves allocated to the plurality of periods and the mean period-measured value curve for the provision of the difference-period-measured value curves allocated in each case to the periods, e) based on the difference-period-measured value curves, determination of a corrected measured value curve for the plurality of successive periods of the periodically repeating event.

In the method according to the present invention, a particular measured value curve is, for example, divided into its periods corresponding to one rotation of a compactor roller as a periodically repeating event. Each of these periods is corrected taking into consideration a mean period-measured value curve produced for these periods. All corrected period-measured value curves can then again be combined into a total corrected measured value curve, which is available for further assessment, for example, with regard to the degree of compaction of the subsoil to be compacted.

Since it basically must be assumed that this compactor will not always move at the same speed over the subsoil to be compacted during the motion of a soil compactor, length of the period, that is, for example, the duration of one rotation of the compactor roller, will not always be the same, also due to the influence, for example, of the slip owing to the periodic oscillatory motion, the plurality of periods can comprise periods of different lengths, and the action b) can comprise an action b1) for normalizing the period-measured value curves for the provision of length normalized period-measured value curves extending over an equal length, namely, for example, a time period. By normalizing the length of the period-measured value curves to he considered, it becomes possible to generate a mean value from all these period-measured value curves in a simple manner, that is, the already addressed mean period-measured value curve. For this length normalization, the action b1) can, for example, in each case comprise the sampling of the period-measured value curves with a predetermined equal number of equidistant samplings, and based on the sampling results obtained for each period-measured value curve, length normalized period-measured value curves can be obtained by an equidistant successive arrangement of the sampling results thereof for all period-measured value curves.

Since the entire level of the measured value curve can change over a longer duration of motion, and thus the different period-measured value curves can lie at a different level, it is further proposed that the action b) comprises an action b2) for the subtraction of a period-measured value curve mean determined for each period-measured value curve from the allocated period-measured value curve for the provision of displaced period-measured value curves.

To determine the mean period-measured value curve, length normalized and/or displaced period-measured value curves can advantageously be used in the action c).

For the formation of the mean period-measured value curve, it can for example be provided that the action c) comprises an action c1) to provide a mean period-measured value curve by forming a mean, preferentially an arithmetic mean, from the plurality of period-measured value curves.

Since, in general, the start and end point of such a mean period-measured value curve will be different from one another, it is further proposed that the action c) comprises an action c2) for connecting several mean period-measured value curves to one another and for mutually fitting directly successive mean period-measured value curves at the interfaces for the provision of a mean-total measurement value curve running continuously over a plurality of preferentially at least three periods. The directly successive, basically identical mean period-measured value curves can be mutually fitted by means of conventional fitting methods, and in consequence the start and end points at the particular period boundaries will be at the same level. It can thereupon be further provided that the action c) comprises an action c3) to determine a measured value curve allocated to a period of the mean-total measured value curve as a mean period-measured value curve. Thus an individual period is extracted, and the section of the mean-total measured value curve contained therein extracted as the mean period-measured value curve, so that basically a measured value curve for this period is present, which, on the one hand, is averaged from the period-measured value curves allocated to the different periods, and, on the other hand, is processed or adapted such that the start and end points are each at the same level, Here, in action c3), a period is advantageously accessed to which another period is adjacent on each side, so that it is ensured that the start and end point of the selected section of the measured value curve has been fitted.

In order to ensure that at the end of the actual correction, that is, the formation of the difference period-measured value curves, the corrected measured value curve again basically is at the same level as the measured value curve to be corrected, it is further proposed that the action e) comprises an action e1) to determine the back-displaced difference-period-measured value curve by adding each difference period-measured value curve to the period-measured value curve determined for the allocated period in action b2).

It is furthermore advantageous, if the action e) comprises an action e2) for normalizing the back length of the difference-period-measured value curve, such that the length of each normalized back length difference-period-measured value curve corresponds to the length of the period-measured value curve determined in allocation to a particular period before the execution of the action b1). In this way, it is ensured that even in the corrected measured value curve, the individual periods again have the period lengths, that is, for example, the period durations, which they had in the measured value curve to be corrected that was used as the start point. For this purpose, it can be provided, for example, that in the action e2), each difference-period-measured value curve is equidistantly sampled with the predetermined quantity and that the sampling results obtained for each difference-period-measured value curve are arranged successively at a distance, said distance corresponding to the distance of the equidistant samplings in the action b1). This action ensures that, in a kind of reciprocal value formation, the operation previously executed to normalize the length is again reversed.

Furthermore, the action e) can comprise an action e3) to provide a difference-total-measured value curve extending over the plurality of periods as a corrected measured value curve by successively arranging the difference-period-measured value curves determined for the periods. To this, the back-displaced and/or back-length-normalized difference-period-measured value curves are advantageously used in order to thus be able to provide the difference-total measured value curve, which is the corrected measured value curve.

BRIEF DESCRIPTION OF THE DRAWING FIGURES

The present invention will be described in detail below with reference to the enclosed figures, wherein.

DETAILED DESCRIPTION OF THE PREFERRED EMBODIMENTS

Figure 1:
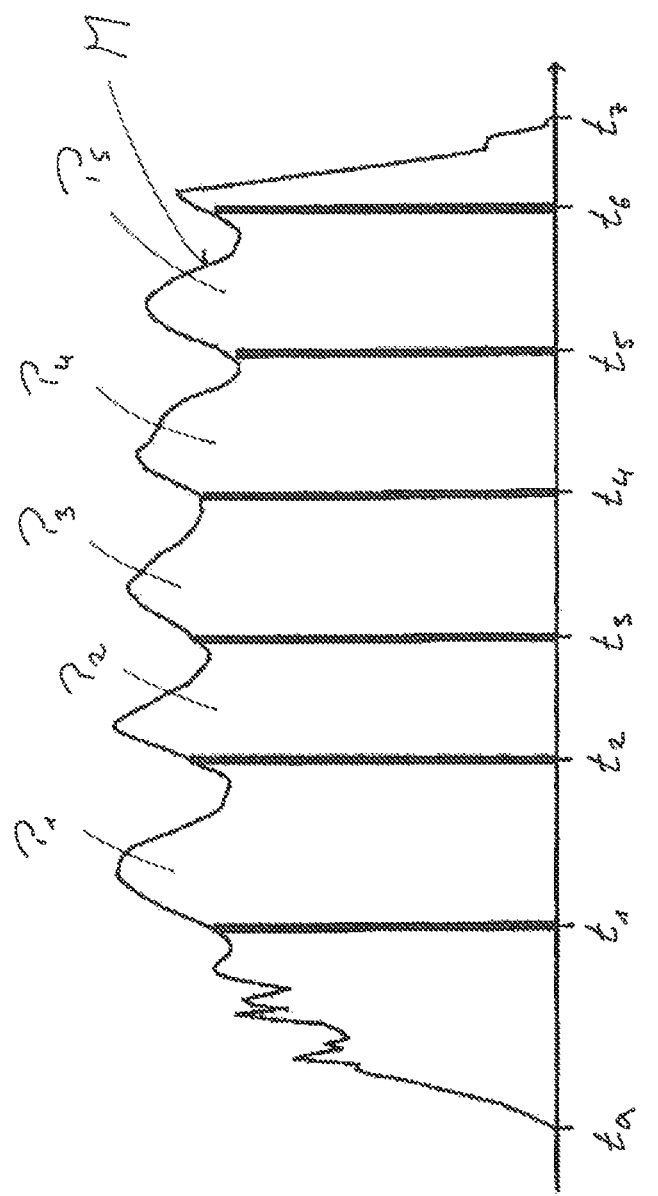
FIG. 1 shows an exemplary measured value curve which is plotted over a time that reflects a circumferential acceleration registered on a compactor roller.
Figure 2:
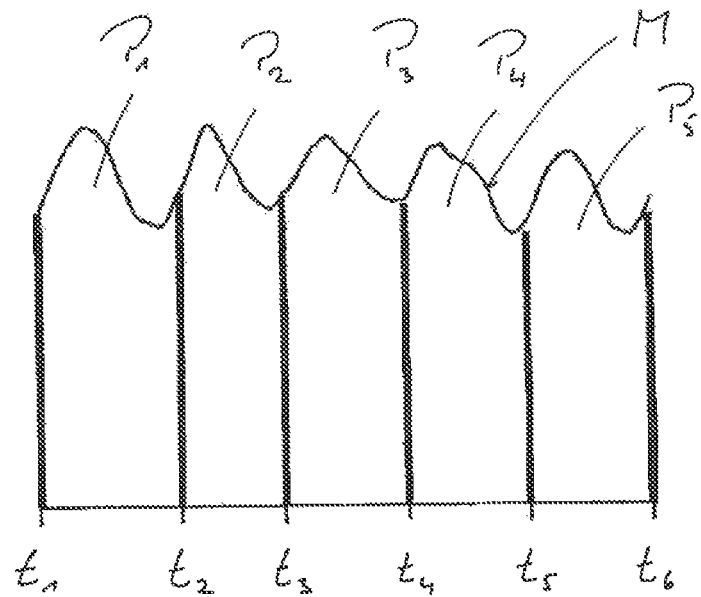
FIG. 2 shows a plurality of directly sequential periods of the measured value curve shown in FIG. 1.

FIG. 1 principally illustrates an exemplary measured value curve M, which represents the circumferential motion, that is, the rotary motion, of a compactor roller of a soil compactor during the execution of a compaction process. Plotted over the time t, the measured value curve M represents, for example, the circumferential acceleration of the compactor roller recorded on a bearing of such a compactor roller in the course of its rotary motion. In this case, we will assume that the motion of the compactor roller or of a soil compactor having such a compactor roller began at a start time $t_a$ and ended at an end time $t_e$. At a time $t_1$, the soil compactor has reached a basically continuous or constant motion state, moving essentially at a substantially uniform speed over the subsoil to be compacted. The times $t_1$, $t_2$, $T_3$, $t_4$, $t_5$, and $t_6$ designate in each case the start and end points of the respective periods $P_1$, $P_2$, $P_3$, $P_4$, and $P_5$, wherein each of these periods represents a full rotation of a compactor roller as a periodically repeating event, for example, recorded by a proximity sensor or the like. In the method for the correction of the measured value curve M with regard to the measurement artifacts contained therein described below, the intervals or periods $P_1$ to $P_5$, basically representing the constant motion state, are used.

Other different motions are superimposed on the periodic rotary motion of a compactor roller occurring in the course of the soil compactor motion. Thus, for example, a comparatively high-frequency oscillatory motion is superimposed on the uniform rotary motion of the compactor roller about its axis of rotation by means of an oscillating mechanism contained in the interior of the compactor roller. This high-frequency oscillatory motion leads to comparatively high circumferential accelerations of the compactor roller, which are reflected in the measured value curve M of FIG. 1 by the comparatively high level. of the measured value curve M between time points $t_1$ and $t_6$. A periodic pattern is further superimposed on the rotation about the compactor roller and the oscillatory motion superimposed on this rotation; said pattern is illustrated in FIG. 1 in the periods $P_1$ to $P_5$ as an almost sinusoidal trace of the measured value curve. This part of the motion, which can be considered to be a measurement artifact, results from the static or dynamic imbalances unavoidably existing in such a compactor roller during the rotary motion of the compactor roller about its axis of rotation, in general also at the same frequency as this rotary motion. This is also shown in FIG. 1.

Figure 13:
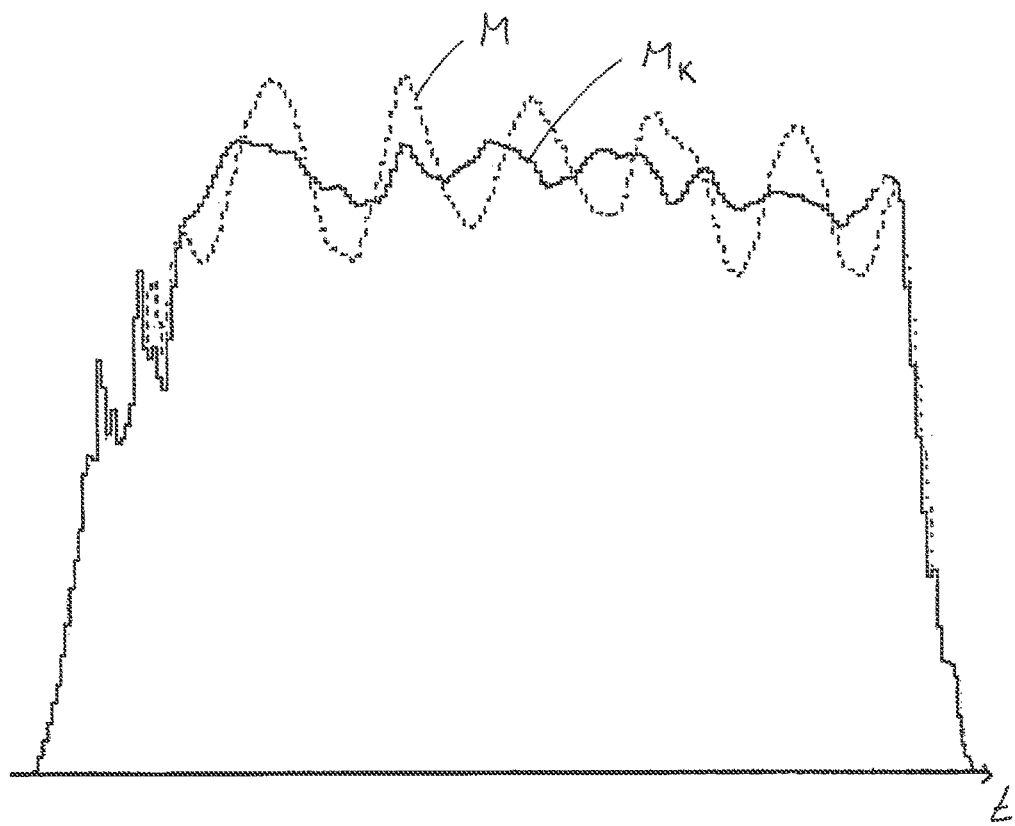
FIG. 13 shows a comparison of the measured value curve illustrated in FIG. 1 with a corrected measured value curve obtained after the execution of the method according to the present invention.

In order to be able to assess the measured value curve M composed, for example, of a plurality of individual measurement points in order to determine the degree of compaction of the subsoil to be compacted, it is necessary to eliminate such measurement artifacts, that is, to remove them from the measured value curve as far as possible. For this purpose, according to the present invention, the methods described below are implemented in order to obtain a corrected measured value curve $M_k$, from the measured value curve M which is also shown in FIG. 13.

For this correction, the part of the measured value curve M shown in FIG. 1 is extracted, in which the signal or the measured value curve M basically can reasonably be used for further assessment. That is, the sections of the measured value curve M before time $t_1$ and after time $t_6$ are not considered during further assessment. The criterion for this selection can, for example, be the attainment or retention of a speed level that is substantially constant or within a limited value range during the forward motion of a soil compactor. It should be pointed out that only a partial section of a measured value curve M extending over a longer duration, with a plurality of directly sequential periods P, can, of course, be selected. The periods $P_1$ to $P_5$ between the times $t_1$ to $t_6$ are used for the following example.

Figure 3:
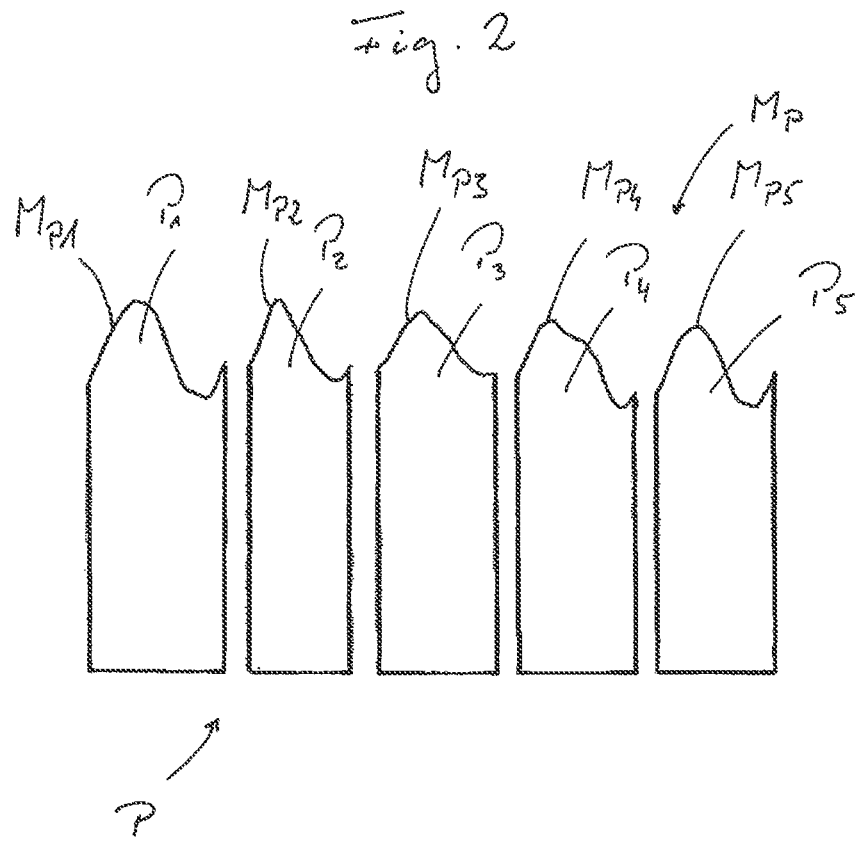
FIG. 3 shows the division of the measured value curve of FIG. 1 or the periods of FIG. 2 into individual periods.

FIG. 3 firstly exemplifies that the measured value curve M is divided into this plurality of periods P, in this case, five periods. Each of these periods $P_1$ to $P_5$ is a partial section of the measured value curve M, hereinafter generally designated as Mg or as allocated to the individual periods $P_1$ to $P_5$ as $M_{P1}$ to $M_{P5}$.

Figure 4:
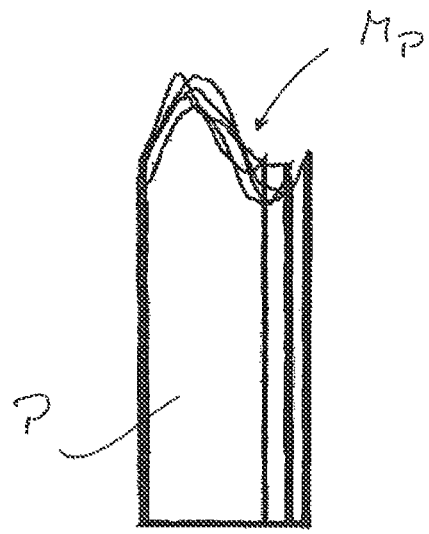
FIG. 4 shows the superposition of the periods of FIG. 3 to illustrate the different period lengths.

In FIG. 4, the five periods $P_1$ to $P_5$ generally designated as periods P, are shown superimposed on one another with their measured value curves $M_P$. It is clearly evident that the periods Pare of different lengths, so that when plotted over time they have different durations. This may be, on the one hand, because a soil compactor does not always advance at an exactly constant speed. On the other hand, it can also mean that, in particular, slipping will occur due to the high-frequency oscillatory motion, which likewise influences the duration of a full rotation.

Figure 7:
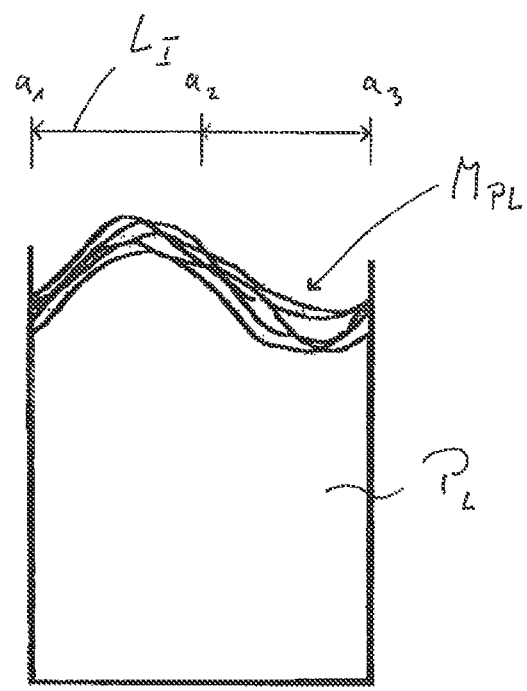
FIG. 7 shows a representation of superimposed length-normalized periods corresponding to FIG. 4.

In order to be able to use the period-measured value curves allocated to the individual periods P for the subsequent assessment or correction of the measured value curve, according to the present invention, the length of the individual periods P or of the measured value curve $M_P$ allocated to said periods P is first normalized. This will be explained below with reference to FIGS. 5 to 7.

Figures 5, 6:
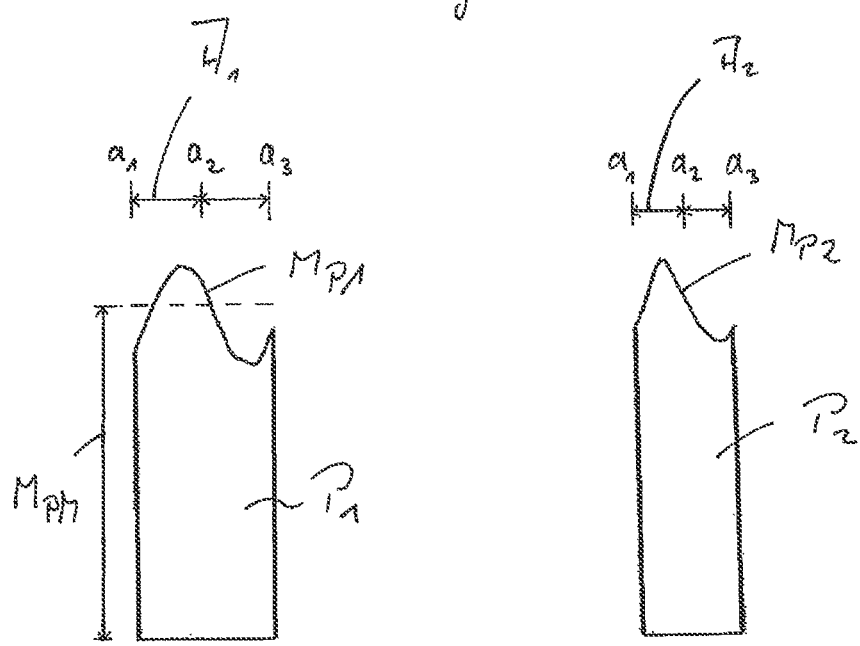
FIG. 5 shows a period of FIGS. 2 and 3.
FIG. 6 shows another period of FIGS. 2 and 3.

FIGS. 5 and 6 by way of example show the periods $P_1$ and $P_2$ with period lengths or period durations differing markedly from one another. According to the present invention, a defined number of samplings is first determined to implement the normalization of the length. The following example shows three samplings, $a_1$, $a_2$, and $a_3$. On implementation of the method according to the present invention, a significantly larger number of samplings will, of course, have to be used. Advantageously, the predetermined number of samplings should at least correspond to the number of measurement values or measurement points of the period-measured value curve with the most measurement values or measurement points. Each of the period-measured value curves $M_{P1}$ and $M_{P2}$ is sampled equidistantly with this number of samplings, here three samplings, wherein the first sampling is reasonably allocated to the start point of a particular measured value curve $M_P$, and the last sampling to the end point of a corresponding measured value curve $M_P$. The intermediate samplings always have exactly the same distance $A_1$ or $A_2$ to the directly adjacent samplings, with the result that the mutual distance of the samplings $a_1$ to $a_3$ will be greater in the period-measured value curve $M_{P1}$ than in the period-measured value curve $M_{P2}$. A sampling result, i.e. a value from the particular period-measured value curve $M_P$ is obtained from each of these samplings $a_1$ to $a_3$, wherein such a value, for example, can correspond to a measured value contained in or adjacent to a particular period-measured value curve $M_P$ or can be obtained by interpolation between two measurement values contained in the respective measured value curve.

In association with each of the period-measured value curve $M_P$ sampled in this way, a predetermined interval $L_1$ is subsequently inserted between the respectively obtained sampling results, so that as a result of the successive arrangement of the individual sampling results of the different period-measured value curves $M_P$, length-normalized period-measured value curves $M_{PL}$, in each case separated by the interval $L_1$, are obtained, which, on the one hand, each have the same number of measured values, namely the respective sampling results, and in which, on the other hand, such measurement values or sampling results have the same distance $L_1$ from directly adjacent measurement values or sampling results, so that all length-normalized period-measured value curves $M_{PL}$ extend over the same length or duration of length-normalized period $P_L$ resulting from the normalization of the length.

Figure 8:
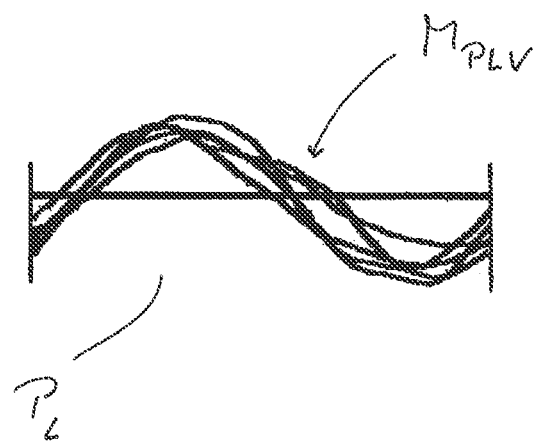
FIG. 8 shows the length-normalized, superimposed period-measured value curves each displaced by one period-measured value curve mean.
Figure 9:
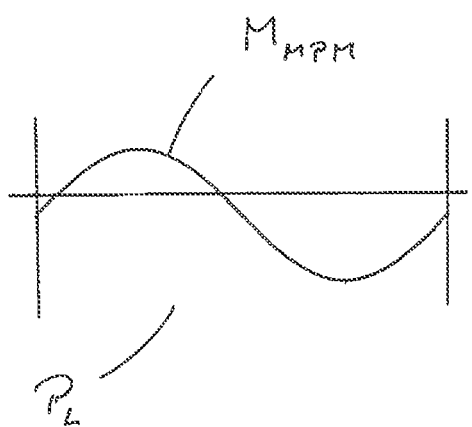
FIG. 9 shows the mean period-measured value curve formed by the individual period-measured value curves.
Figure 10:
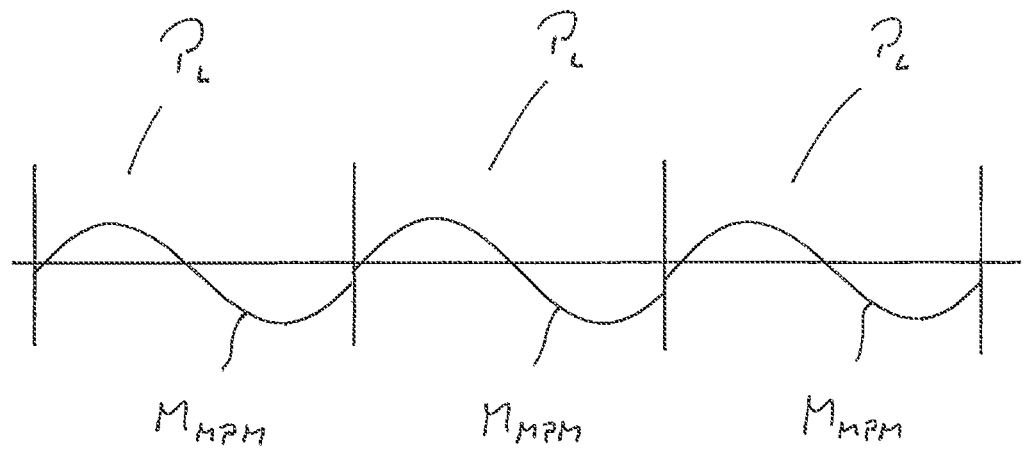
FIG. 10 shows the juxtaposition of several identical mean period-measured value curves of FIG. 9.

The so length-normalized measured value curves $M_{PL}$ are then displaced, namely in each case by a period-measured value curve mean value $M_{PM}$ to be determined from the period-measured value curve $M_P$ allocated to said period P, as is also shown in FIG. 5. As a result of this displacement, As shown in FIG. 8, a large number of length-normalized and period-measured value curves $M_{PLV}$ displaced toward the zero point is obtained. From all these length-normalized and displaced period-measured value curves $M_{PLV}$a mean period-measured value curve $M_{MPM}$ shown in FIG. 9 is determined by defining the arithmetic mean for the notional length-normalized period $P_L$. A plurality of these mean period-measured value curves $M_{MPM}$ is arranged in direct succession in a plurality of length-normalized periods $P_L$ directly attached to one another, as shown in FIG. 10. As can also be clearly seen from FIG. 10, the result is that the start and end points of the directly successive mean period-measured value curves $M_{MPM}$ do not continuously join one another on the respective period boundaries, so that for the individual period-measured value curves $M_P$ and accordingly also for the mean period-measured value curves $M_{MPM}$ determined thereby, the start and end value are different from one another. In order to obtain a constant curve, conventional fitting methods can be used to fit the successively arranged mean period-measured value curves $M_{MPM}$, and thus to obtain a constant mean total measured value curve $M_{MGM}$ shown in FIG. 11 for a plurality of successive, length-normalized periods $P_L$.

Figure 11:
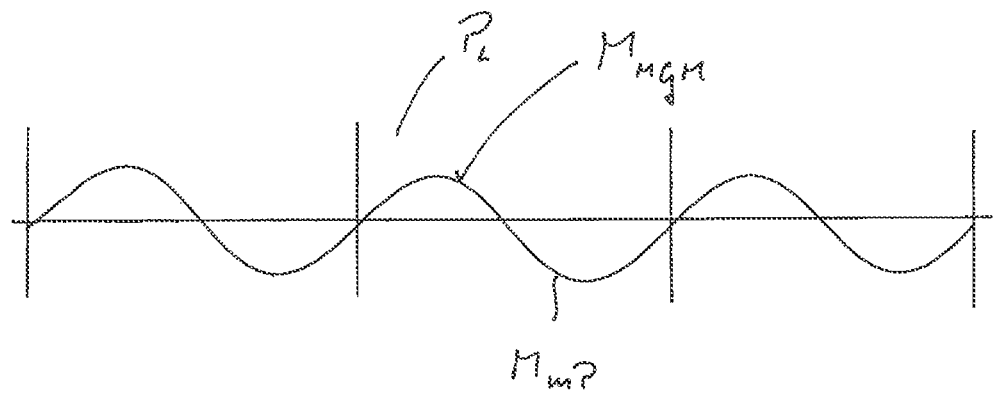
FIG. 11 shows a representation corresponding to FIG. 10 in which the end and start points of the juxtaposed mean period-measured value curves are fitted to one another.

A section is extracted from the mean-total measured value curve $M_{MGM}$ shown in FIG. 11, which is allocated to one of the length-normalized periods $P_L$. Here, a length-normalized period $P_L$ is advantageously accessed that lies between two other such periods, so that it is ensured that the extracted section of the mean-total measured value curve $M_{MGM}$ was each processed at the start and end point with the above-mentioned fitting, with the consequence that the start point and the end point of this section, extracted as the mean period-measured value curve $M_{mP}$ are at the same level.

Figure 12:
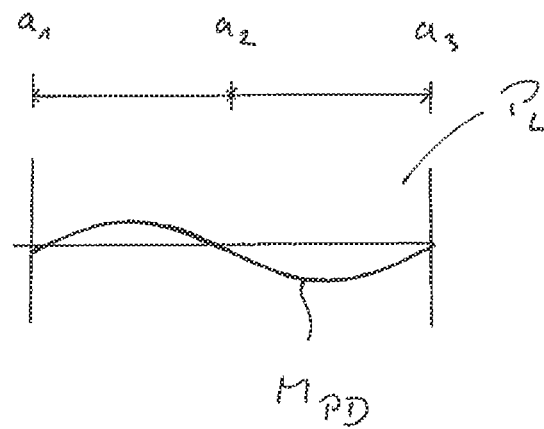
FIG. 12 shows an individual extracted measured value curve segment from the diagram of FIG. 11 representing a mean period-measured value curve.

With this mean period-measured value curve $M_{mP}$ determined or extracted for a length-normalized period $P_L$, the actual correction is then carried out for the individual periods $P_1$ to $P_5$ or their length-normalized and displaced period-measured value curves $M_{PLV}$ in that a difference is determined between the respective length-normalized and displaced period-measured value curves and the mean period-measured value curve $M_{mP}$. Such a difference-period-measured value curve $M_{PD}$ generated by forming the difference is exemplified, for example, in FIG. 12 for the first period $P_1$ in this case extracted as a length-normalized period $P_L$. It should be pointed out that a corresponding operation is also to be implemented for all the other periods $P_2$ to $P_5$, and thus a difference-period-measured value curve is obtained in allocation to each of these periods. Such a difference period-measured value curve will then be available in allocation to each of the periods $P_1$ to $P_5$.

In order to obtain the corrected measured value curve $M_K$ shown in FIG. 13 from these individual difference-period measured value curves, it is first necessary to again cancel the previously implemented length normalization as well as the prior displacement. The back length of the individual difference period-measured value curves can be normalized in that they are sampled with the same predetermined number of equidistant samplings, here $a_1$ to $a_3$, as previously the period-measured value curves $M_P$ were sampled to normalize the length. The sampling results obtained with these samplings $a_1$ to $a_3$ in allocation to the different difference-period-measured value curves are then arranged at the mutual distance from one another, which existed between the individual samplings $a_1$ to $a_3$ of the individual period-measured value curves $M_P$ as part of the length, normalization. In the example shown in FIG. 5 and FIG. 6, these were the distances $A_1$ and $A_2$ in allocation to the periods $P_1$ and $P_2$. In this manner, the previously implemented length normalization is reversed in allocation to each period P, so that in the shown example, that is, $P_1$ to $P_5$, a back length-normalized difference period-measured value curve is obtained for each of these periods P. Each of these back-normalized difference-period measured value curves is then back-displaced with the previously determined period-measured value curve $M_{PM}$ (see FIG. 5) in allocation to each individual period P. Due to the previously implemented operations, this ensures that the difference-period-measured value curves again back-displaced to the initial level are continuously adjacent to one another in a successive arrangement. As a result of this successive arrangement of the back length-normalized and back-displaced difference-period-measured value curves obtained in allocation to the individual periods P, a difference-total-measured value curve is obtained that corresponds to the corrected measured value curve $M_K$, wherein such a curve substantially only exists for the time during which the previously assessed periods extend in their totality. In the shown example, that is, before $t_1$ and after $t_6$, the corrected measured value curve $M_K$ can, for example, be defined as corresponding to the initial measured value curve M for the previous and subsequent time.

FIG. 13 shows that a significantly smaller periodic overlapping part is contained in the corrected measured value curve $M_K$ than in the measured value curve M used as the initial point. The result is that the corrected measured value curve $M_K$ is substantially better suited for further analysis, in particular, with regard to the determination of the degree of compaction of the subsoil to be compacted.

It should finally be pointed out that variations of the above described method for the correction of a measured value curve can, of course, be implemented in many ways without deviating from the basic principle of the present invention. For example, a particular measured value curve can be displaced or back displaced before the length normalization or back length normalization. Also, in particular, other technical assessment methods can be used for length normalization or back length normalization in order to ensure that the period-measured value curves allocated to the different periods are stretched or compressed to the same length.

The invention claimed is:

1. A method for improving precision of a degree of subsoil compaction produced by a rotating compactor roller of a soil compactor in a compaction process, comprising:
   A) providing a curve representing the motion of the rotating compactor roller, step A) comprising the actions:
   a) provision of a measured value curve by recording a circumferential acceleration of the rotating compactor roller in a course of its rotary motion representing a periodically repeating event corresponding to one full rotation of the compaction roller, wherein the circumferential acceleration of the rotating compactor roller is recorded by at least one acceleration sensor;
   b) division of the measured value curve into period-measured value curves allocated to a plurality of successive periods of the periodically repeating event, the action b) comprising an action b2) for the subtraction of a period-measured value curve mean value determined for each period-measured value curve from the allocated period-measured value curve for the provision of displaced period-measured value curves;
   c) based on the period-measured value curves allocated to the plurality of periods, determination of a mean period-measured value curve;
   d) formation of a difference between the period-measured value curves allocated to the plurality of periods, and the mean period-measured value curve for the provision of the difference-period-measured value curves allocated in each case to the periods; and
   e) based on the difference period-measured value curves, determination of a corrected measured value curve for the plurality of successive periods of the periodically repeating event for thereby providing the curve representing the motion of the rotating compactor roller, the action e) comprising an action e1) for the determination of back-displaced difference-period-measured value curves by adding the difference-period-measured value curve each with the period-measured value curve mean value determined for the allocated period in the action b2);

B) evaluating the curve representing the motion of the rotating compactor roller for providing information relating to the degree of compaction of the compacted subsoil; and C) compacting the subsoil via the soil compactor based on the information relating to the degree of compaction.

2. The method in accordance with claim 1, wherein the plurality of periods comprises periods of different period lengths, and that step b) comprises b1) for normalizing the length of the period-measured value curves for the provision of length-normalized period-measured value curves extending over an equal length.

3. The method in accordance with claim 2, wherein step b1) comprises the sampling of the period-measured value curves, each with a predetermined, equal number of equidistant samplings for all period-measured value curves, and that, based on the sampling results obtained in each period-measured value curve, length-normalized period-measured value curves are obtained by means of an equidistant successive arrangement of the sampling results thereof for all period-measured value curves.

4. A method according to claim 2, wherein in step c), the length-normalized or/and displaced period-measured value curves are used to determine the mean period-measured value curve.

5. A method according to claim 1, wherein step c) comprises c1) for the provision of a mean period-measured value curve by forming a mean from the plurality of period-measured value curves.

6. The method according to claim 5, wherein step c) comprises c2) for joining several mean-period-measured value curves and for fitting directly successive mean-period-measured value curves to one another at the interfaces for the provision of a mean-total-measured value curve running continuously over a plurality of at least three periods.

7. The method according to claim 6, wherein step c) comprises c3) for the determination of the measured value curve allocated to a period of the mean-total measured value curve as a mean period-measured value curve.

8. The method according to claim 7, wherein in step c3), a period is accessed to which another period is adjacent on both sides.

9. The method according to claim 2, wherein step e) comprises e2) for back length normalization of the difference-period-measured value curves such that the length of each back length-normalized difference-period-measured value curve corresponds to the length of the period-measured value curve defined in allocation to a respective period before implementing the action b1).

10. The method according to claim 3, wherein the plurality of periods comprises periods of different period lengths, and that step b) comprises b1) for normalizing the length of the period-measured value curves for the provision of length-normalized period-measured value curves extending over an equal length, wherein step e) comprises e2) for back length normalization of the difference-period-measured value curves such that the length of each back length-normalized difference-period-measured value curve corresponds to the length of the period-measured value curve defined in allocation to a respective period before implementing the action b1), and wherein in step e2), each difference-period-measured value curve is sampled equidistantly with the predetermined number, and that the sampling results for each difference-period-measured value curve are arranged successively at a distance, which distance corresponds to the distance of the equidistant samplings in the action b1).

11. A method according to claim 1, wherein that step e) comprises e3) for the provision of a difference-total-measured value curve extending over the plurality of periods as a corrected measured value curve by successively arranging the difference-period-measured value curves determined for the periods.

12. The method according to claim 3,
wherein that step e) comprises e1) for the determination of back-displaced difference-period-measured value curves by adding the difference-period-measured value curve each with the period-measured value curve mean determined for the allocated period in the action b2), wherein that in step e3), the back-displaced or/and back length-normalized difference-period-measured value curves are used to determine the difference-total-measured value curve.

13. A method according to claim 5, the provision of a mean period-measured value curve is formed by an arithmetic mean from the plurality of period-measured value curves.

* * * * *